E. KOTTUSCH.
PISTON RING.
APPLICATION FILED OCT. 29, 1918.
1,323,192.
Patented Nov. 25, 1919.
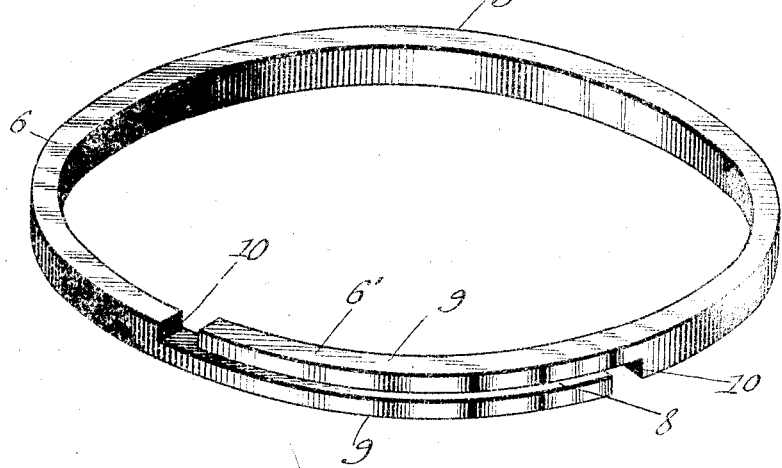
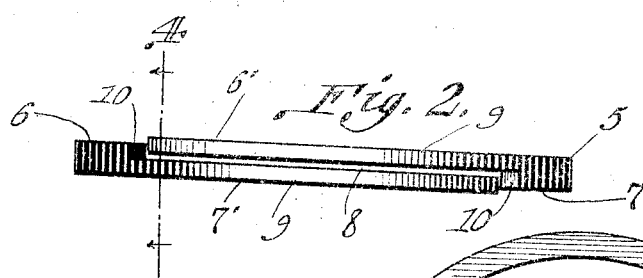
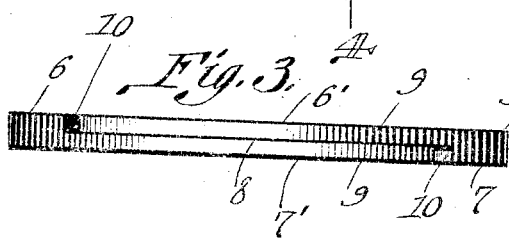
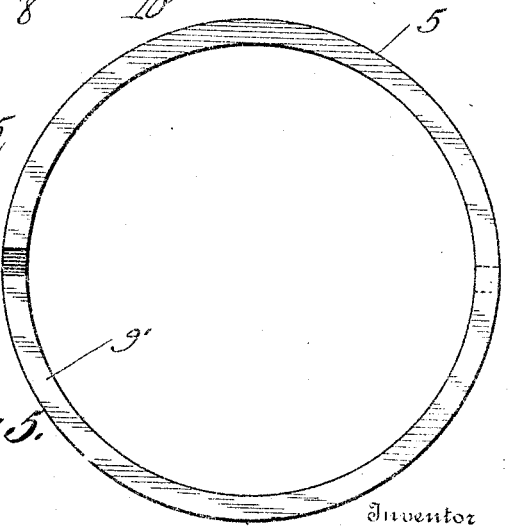
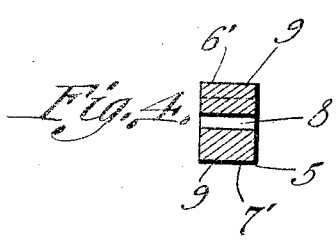
Inventor
Emil Kottusch
By Norman J. Whitaker
his Attorney

UNITED STATES PATENT OFFICE.

EMIL KOTTUSCH, OF DETROIT, MICHIGAN.

PISTON-RING.

1,323,192.  Specification of Letters Patent.  Patented Nov. 25, 1919.

Application filed October 29, 1918. Serial No. 260,179.

*To all whom it may concern:*

Be it known that I, EMIL KOTTUSCH, a citizen of the United States, and a resident of Detroit, in the county of Wayne and State of Michigan, have invented new and useful Improvements in Piston-Rings, of which the following is a specification.

This invention relates to piston rings particularly adapted to be used in connection with internal combustion engines although not restricted in use to internal combustion engines.

An important object of the invention is to provide a piston ring of the above named class which possesses sufficiently uniform elasticity and resiliency to insure a perfect seal between the two ends of a piston operating within a cylinder.

A further object of the invention is to provide in a ring of the above named class a means whereby all noise or chattering of the ring when fitted into the chase of a piston is entirely eliminated.

A further object of the invention is to provide a ring of the above named class which is cheap to manufacture and highly effective in use.

Other objects and advantages of the invention will be apparent from the following description taken in connection with the accompanying drawings.

In the drawings, forming a part of this specification and in which like numerals are employed to designate like parts throughout the same, Figure 1 is a perspective view of a piston ring embodying the preferred form of my invention, Fig. 2 is a side elevation of the same, Fig. 3 is a similar view to Fig. 2, the tongues being shown in contact with each other, Fig. 4 is a sectional view taken on line 4—4 of Fig. 2, and, Fig. 5 is a plan view of a piston ring embodying a modified form of my invention.

In the drawings, attention being called to Figs. 1 to 4 inclusive, wherein is shown the preferred form of my invention, the numeral 5 indicates an annular ring of resilient metal having upper and lower faces 6 and 7 which are machined to provide uniformly smooth surfaces. The ring 5 is split as shown at 8 to provide overlapping tongues 9 which are normally spaced, preferably a thirty-second of an inch, from each other. The ends of the overlapping tongues 9 are normally spaced from mating faces 10 provided by the ring 5, the area of which mating faces is equal to the area of the ends of the overlapping tongues 9. I wish to emphasize here the fact that the thickness of each of the overlapping tongues is equal to one-half the thickness of the ring 5. It is therefore obvious that since the overlapping tongues 9 are each in thickness equal to one-half the thickness of the ring 5 they are in thickness equal to each other. Since the combined thickness of the overlapping arms 9 is equal to the thickness of the ring 5 and the arms 9 are normally spaced, preferably one thirty-second of an inch, apart the distance between the faces 6' and 7' of the tongues 9 is necessarily greater than the thickness of the ring 5 by that fraction of an inch which is equal to the space normally afforded between the tongues 9.

It will be noted when considering particularly Figs. 2 and 4 that the plane of the face 6' is spaced from the line formed at the intersection of the plane of the face 6 and the plane of the adjacent mating face 10, which space is equal to the space afforded between the overlapping tongues 9, and likewise the plane of the face 7' is spaced from the line formed at the intersection of the plane of the face 7 and the adjacent mating face 10, which space is equal to the space formed between the overlapping tongues. In placing a piston, having the ring embodying my invention associated therewith, into a cylinder the ring is circumferentially compressed, which circumferential compression is permitted due to the space afforded between the ends of the tongues 9 and the mating faces 10. The ring, due to its resiliency, will, upon being inserted into the cylinder, circumferentially expand. The tongues 9 of the ring are moved to the position shown in Fig. 3 when the ring is placed into the chase of the piston and due to the tendency of the overlapping tongues to separate from each other and assume the position shown in Fig. 2, the ring as a whole, due to the engagement of the faces 6' and 7' of the tongues 9 with the walls of the chase, is held firmly in position upon the piston. During the compression stroke or the working stroke of the piston the tendency of the tongues 9 to separate from each other is overcome by the pressure set up within the cylinder in which instance the tongues 9 are forced firmly together. Since by the circumferential expansion the periphery of the ring is maintained at all times firmly in engagement with the walls of the cylinder and since the tongues 9 are pressed firmly together as shown in Fig. 3 whenever there is a pressure exerted within the cylinder an absolute gas tight jointure is formed between the ends of the piston within the cylinder.

In considering Fig. 5, wherein is shown a modified form of my invention, it need only be stated that the ring is substantially the same as that hereinbefore described except the tongues 9 are made to equal substantially one-half the circumference of the ring rather than substantially a third of the circumference as in the case of the preferred embodiment of my invention hereinbefore described.

The method of making the piston ring herein shown, described and claimed is disclosed in my pending application entitled Method of making piston rings, filed September 19, 1918, bearing Serial No. 254,704, wherein it is pointed out that the rough annular ring is split longitudinally and cut radially to provide the overlapping tongues 9, the space between the tongues being substantially equal to the saw or other suitable element used to split the ring longitudinally. The tongues are then, by any suitable means, clamped together so that their inner surface will properly contact with each other, whereupon the ring is ground or finished to provide a smooth surface on each side thereof, the finishing being done while the tongues are clamped together. It necessarily follows that when the tongues are released from engagement with each other they will be, as a result of the resiliency of the metal, separated to provide the openings between the tongues 9—9. In grinding or finishing the ring while the tongues are clamped together care is taken to so grind the opposite sides of the ring as to provide tongues having equal breadth and thickness throughout their length, which tongues have a total cross-sectional area of the unsplit portion of the ring.

It is to be understood that various changes in the shape, size and arrangement of parts may be resorted to without departing from the spirit of my invention or the scope of the subjoined claim.

Having thus described my invention, what I claim as new and desire to secure and protect by Letters Patent of the United States, is:

A piston ring comprising an annular body split to provide mating faces and a pair of overlapping resilient tongues normally spaced apart to more intimately engage the walls of the chase than the unsplit or solid portion of the ring, the resiliency of said tongues being sufficient to firmly retain the tongues in engagement with the walls of the piston chase whereby rattling and excessive rotative movement of the ring within the chase during the operation of the piston is prevented, said tongues being adapted to engage each other throughout the length of each when pressure is axially exerted upon the ring within a cylinder, the smallest cross sectional area of the tongues being equal to the smallest cross sectional area of the unsplit portion of the ring, each tongue having a uniform breadth and thickness throughout its length, the tongues being provided with end faces normally spaced from said mating faces and adapted to abut said mating faces when the ring is circumferentially compressed within a cylinder.

EMIL KOTTUSCH.